United States Patent [19]

Kinoshita

[11] Patent Number: 5,043,846
[45] Date of Patent: Aug. 27, 1991

[54] PIVOTABLE DISPLAY UNIT SUPPORT STRUCTURE FOR ELECTRONIC APPARATUS

[75] Inventor: Yoshiki Kinoshita, Suwa, Japan

[73] Assignee: Seiko Epson Corporation, Japan

[21] Appl. No.: 507,400

[22] Filed: Apr. 10, 1990

[30] Foreign Application Priority Data

Apr. 10, 1989 [JP] Japan .................................. 1-41882
Apr. 17, 1989 [JP] Japan .................................. 1-44804

[51] Int. Cl.$^5$ ...................... H05K 5/02; F16M 13/00
[52] U.S. Cl. .................................. 361/394; 361/393;
312/327; 248/919; 16/308
[58] Field of Search ............... 364/708; 312/227, 244,
312/327; 361/340, 393, 394, 395; 358/236, 254;
340/700, 711; 16/306, 307, 308, 337, 386;
248/917, 918, 919, 920

[56] References Cited

U.S. PATENT DOCUMENTS

| | | | |
|---|---|---|---|
| 4,571,456 | 2/1986 | Paulsen et al. | 179/2 C |
| 4,842,378 | 6/1989 | Flasck et al. | 364/708 |
| 4,852,033 | 7/1989 | Saitou | 364/708 |

FOREIGN PATENT DOCUMENTS

| | | |
|---|---|---|
| 0159217 | 12/1980 | Japan .................................. 340/700 |
| 160526 | 4/1986 | Japan . |

OTHER PUBLICATIONS

NEC Publication DPR-168 E, Mar., 1988.
"Full ISDN in action at TELECOM87", Telecommunications, Mar., 1988.

Primary Examiner—Leo P. Picard
Assistant Examiner—Michael W. Phillips
Attorney, Agent, or Firm—W. Douglas Carothers, Jr.

[57] ABSTRACT

A pivotable display unit support structure for an electronic apparatus, e.g., a laptop or portable computer, comprises a pivotable display unit pivotally connected to the housing of the apparatus employing an integral frame member connected to the display unit and wherein a first shaft member is coupled to one end portion of the apparatus housing for maintaining a preselected angle of the pivotable display unit with respect to the surface of the apparatus housing and a second shaft member is coupled to an other end of the integral frame member apparatus housing whereby the display unit is rotatably supported relative to the apparatus housing. The frame member has first and second positioning and alignment structure for respectively receiving, positioning and aligning the first and second shaft members in proper aligned and secured relationship relative to the apparatus housing while enhancing the overall strength and support of the display unit support structure.

18 Claims, 5 Drawing Sheets

PIVOTABLE DISPLAY UNIT SUPPORT STRUCTURE FOR ELECTRONIC APPARATUS

BACKGROUND OF THE INVENTION

This invention relates generally to a pivotable display unit support structure for electronic apparatus, such as a laptop computer or a portable computer or the like, wherein a display unit is pivotally connected or hinged to the housing of the electronic apparatus and adjusted for desired viewing angle.

FIGS. 1A and 1B respectively illustrate conventional pivotable display unit support structures known in the art. In the pivotable display unit support structure shown in FIG. 1A, a pivotable display unit 1 and electronic apparatus housing 2 are coupled so that unit 1 is rotatable about shaft member 5 and frictional shaft member 4 and is secured into position by reinforcing support member 3. Member 3 is an L-shaped metal plate and has an aperture at its lower end for support on shaft member 4 and is secured at its other end to one side of pivotable display unit 1 as shown at 4A. The shaft portion of frictional shaft member 4 is inserted into an insertion hole of housing 2 and thereafter secured in this position. Shaft member 5 is rotatably supported in housing 2 at its outer end to support the other side of pivotable display unit 1.

In the pivotable display unit support structure shown in FIG. 1B, one end portion of electronic apparatus housing 7 and pivotable display unit 6 are coupled to each other with use of frictional shaft member 8 which is secured to housing 7 at one end and includes reinforcing member 8A for securing member 8 to pivotable display unit 6. Shaft extension portion 7A extends from receptacle side edge in housing 7 and is inserted into aperture 6A formed in pivotable display unit 6 thereby coupling together the other end portion of pivotable display unit 6 to housing 7.

In these conventional pivotable display support structures, the frictional shaft members 4 and 8 are secured independently of the extended shaft member or aperture portions of the respective apparatus housing 2 and 7 and pivotable display units 1 and 6, and as a result, the precision by which shaft alignment is obtained and maintained is relatively poor.

In the pivotable display unit support structure shown in FIG. 1A, mounting precision between reinforcing support member 3 and frictional shaft member 4 poses a problem because a clearance is generally formed or required between the aperture in reinforcing member 3 and the shaft portion of frictional shaft member 4 to facilitate mounting operations. When the initial clearance is excessively large or enlarged due to subsequent movement of display unit from continuous use, pivotable display unit 1 will no longer be easily positioned at a desired viewing angle and display unit 1 will not properly align with housing 2 in its closed position. On the other hand, when this initial clearance is too small, assembly of associated components of display unit 1 and housing 2 becomes difficult and pivotable adjustment of unit 1 is stiff and is not easily adjusted to a desired viewing angle. Reinforcing member 3 and frictional shaft member 4 must, therefore, be mounted with high precision in order to avoid these problems. Moreover, even if they are mounted with high precision, the weight of pivotable display unit 1 is concentrated on the bearing portions of the associated coupling components of unit 1 and housing 2, i. e. rotatable support members 4 and 5, which increases the wear of these parts developing an excessive clearance and resulting in increased difficulty in setting the angular adjustment of display unit in its open position, as previously indicated.

In the pivotable display unit support structure shown in FIG. 1B, since frictional shaft member 8 is directly secured to display unit 6 via member 8A, the weight of display unit 6 is concentrated directly on portion 7A and member 8A which function as bearing supports. For this reason, flexure occurs in the shaft portions and of the support points and error readily occurs in mounting frictional shaft member 8 relative to its shaft portion. In particular, since the shaft portions of members 7A and 8 are constructed of plastic material, the amount of flexure of member 8 is large, which adversely affects the ultimate precision in the mounting of these components.

It is, therefore, an object of this invention to provide a pivotable display unit support structure having high precision in shaft alignment and support strength.

SUMMARY OF THE INVENTION

According to this invention, a pivotable display unit support structure for an electronic apparatus, e. g., a laptop or portable computer, comprises a pivotable display unit pivotally connected to the housing of the apparatus employing an integral frame member connected to the display unit and wherein a first shaft member is coupled to one end portion of the apparatus housing for maintaining a preselected angle of the pivotable display unit with respect to the surface of the apparatus housing and a second shaft member is coupled to an other end of the integral frame member apparatus housing whereby the display unit is rotatably supported relative to the apparatus housing. The frame member has first and second positioning and alignment means for respectively receiving, positioning and aligning the first and second shaft members in proper aligned and secured relationship relative to the apparatus housing while enhancing the overall strength and support of the display unit support structure.

The pivotable display unit support structure of the present invention is designed so that the first and second shaft members are integrally positioned by the frame member. For this reason, when the pivotable display unit is secured to the frame member and the housing of the electronic apparatus is secured to the first and second shaft members, the pivotable display unit is firmly secured to the housing and is pivotally coupled to electronic apparatus housing without need of any additional adjustment or further precision adjustment.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 3:
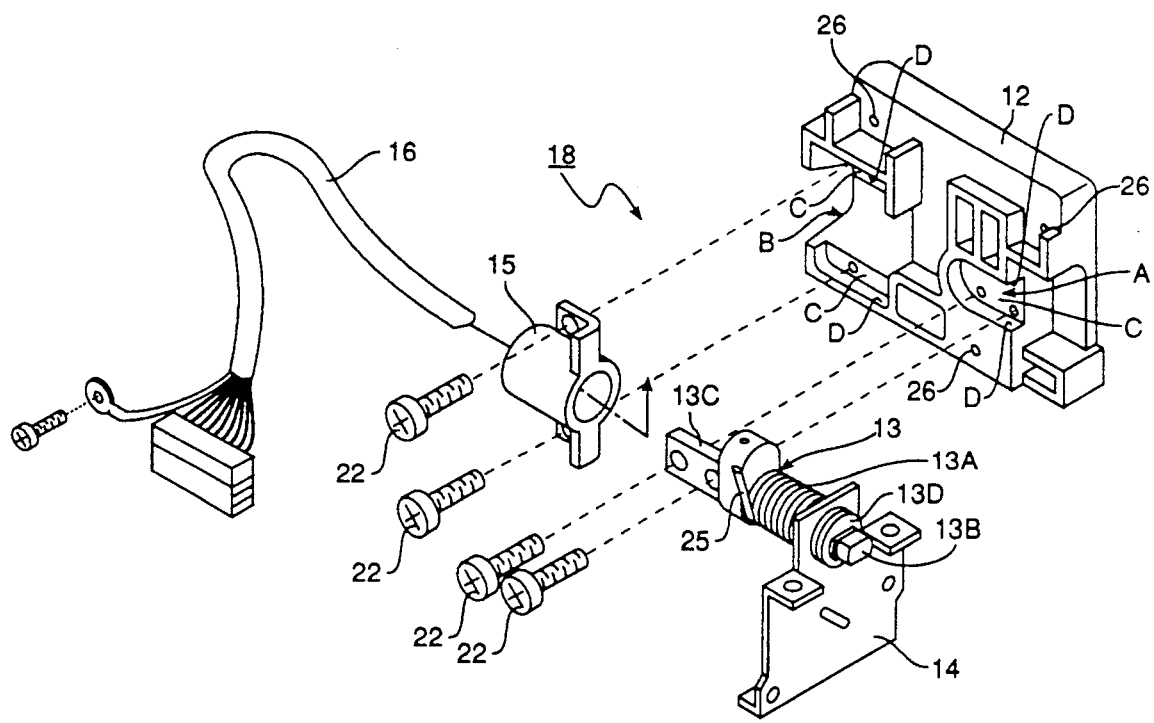
FIG. 3 is an exploded perspective view of the pivotable display unit support structure comprising another embodiment of this invention.
Figure 4:
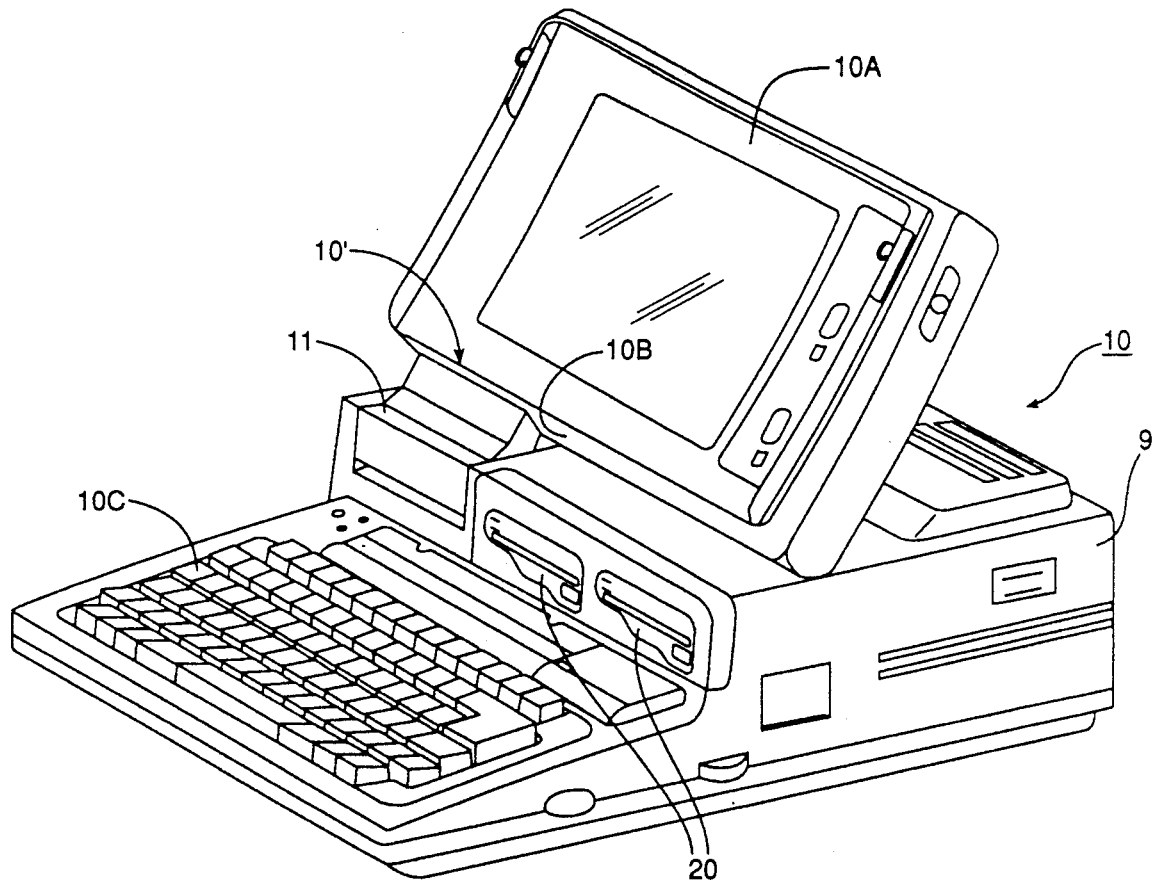
FIG. 4 is a perspective view of the outer appearance of the electronic apparatus employing the support structure shown in FIGS. 2A, 2B and 3.

The pivotable display unit support structure 18 according to this invention is disclosed in FIG. 3 and is applicable to an electronic apparatus 10, shown in FIG. 4 relative to support hinge arm 11 for pivotally supporting display unit 10A with respect to housing 9 of electronic apparatus 10, e. g., a laptop computer. Support arm 11 is arranged at one side of housing 9, as shown in FIG. 4, in order to rotatably support display unit 10A at the left portion of the bottom edge 10B of unit 10A. Because of the added strength provided by support structure 18 of this invention, support arm 11 can be provided at one edge portion 10' at the bottom edge 10B of unit 10A functioning as the pivot and fulcrum point for the display unit mass which over extends housing 9 as supported from edge portion 10'. As a result, one or more access units, such as floppy disk drives 20, may be located in a front facing position of housing 9 above keyboard 10C for easy access by an operator in utilizing these access units. In this connection, drives 20 are above the level of keyboard 10C at about chest level of the user for easy access for insertion and withdraw of floppy disks. This positioning is made possible by repositioning hinge arm 11 to edge portion 10' of display unit 10A and providing hinge arm 11 with reinforcement to support the overhanging display unit 10A while also providing for positioning and alignment means in pivotable display unit support structure 18 for accurate alignment upon assembly of display unit 10A to housing 9, as explained below.

Figure 1A:
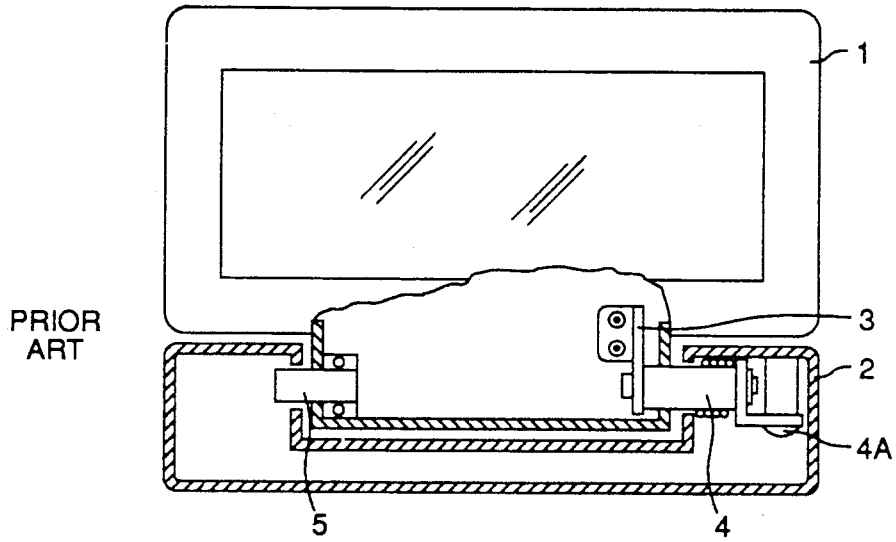
FIGS. 1A and 1B are sectional views of conventional pivotable display unit support structures as known in the art.
Figure 1B:
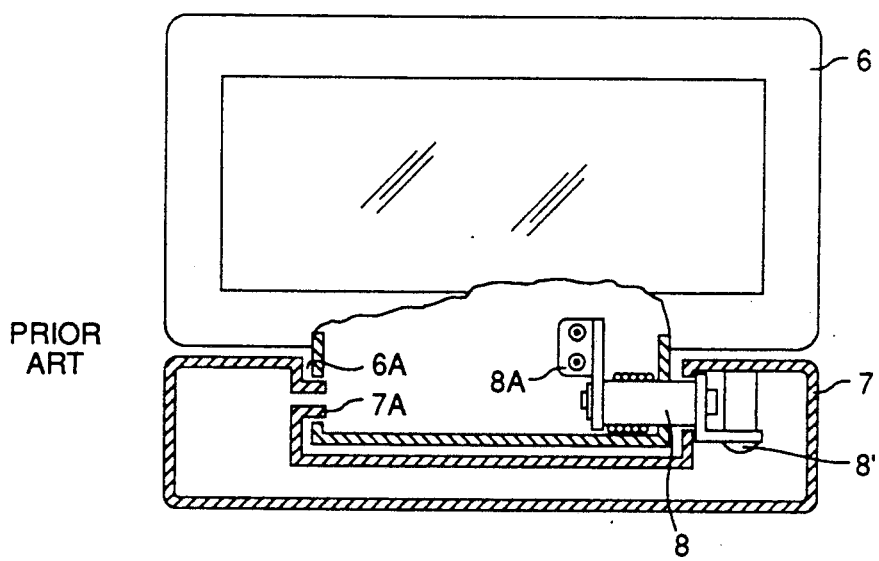
Figure 2A:
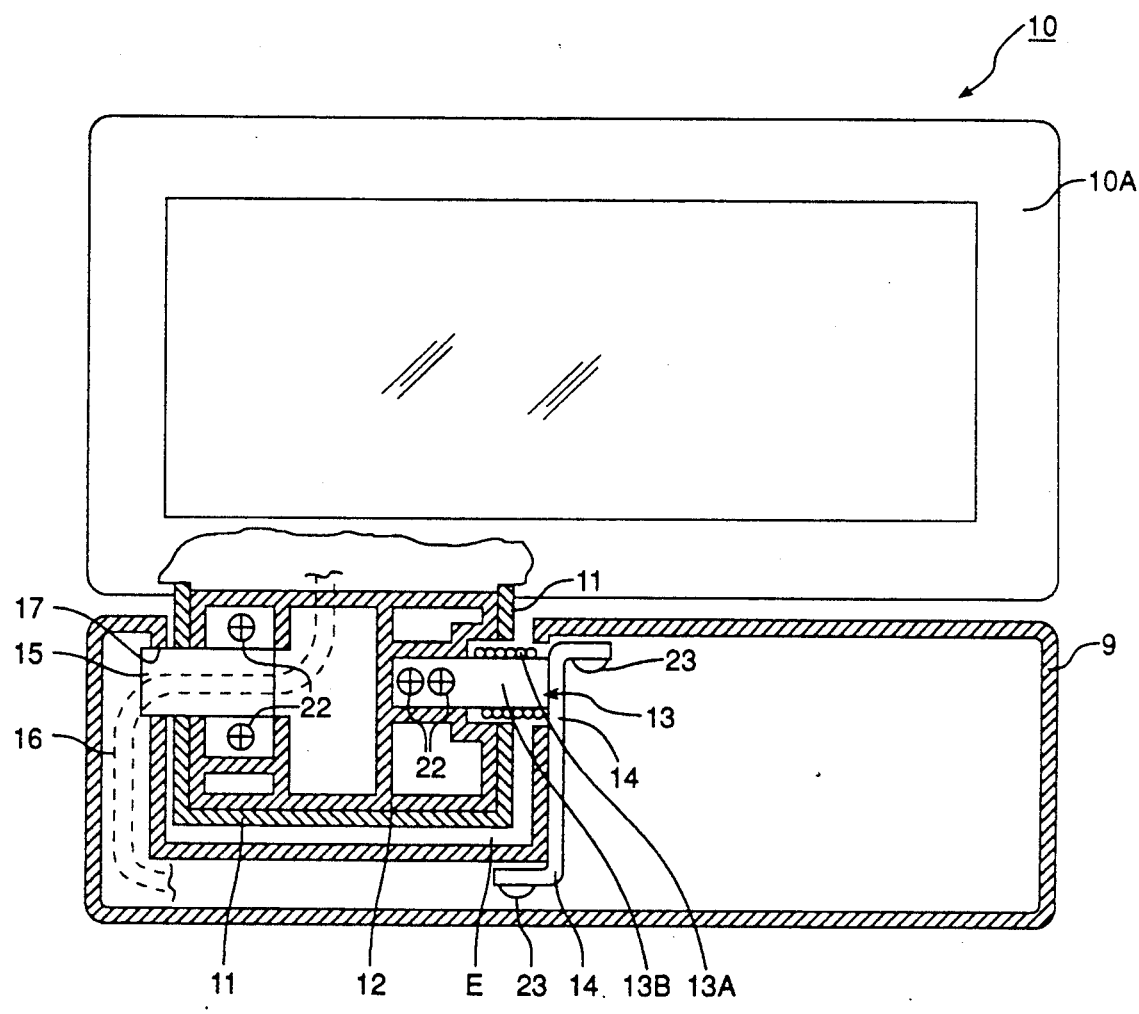
FIGS. 2A and 2B are sectional views of a pivotable display unit support structure comprising one embodiment of this invention.
Figure 2B:
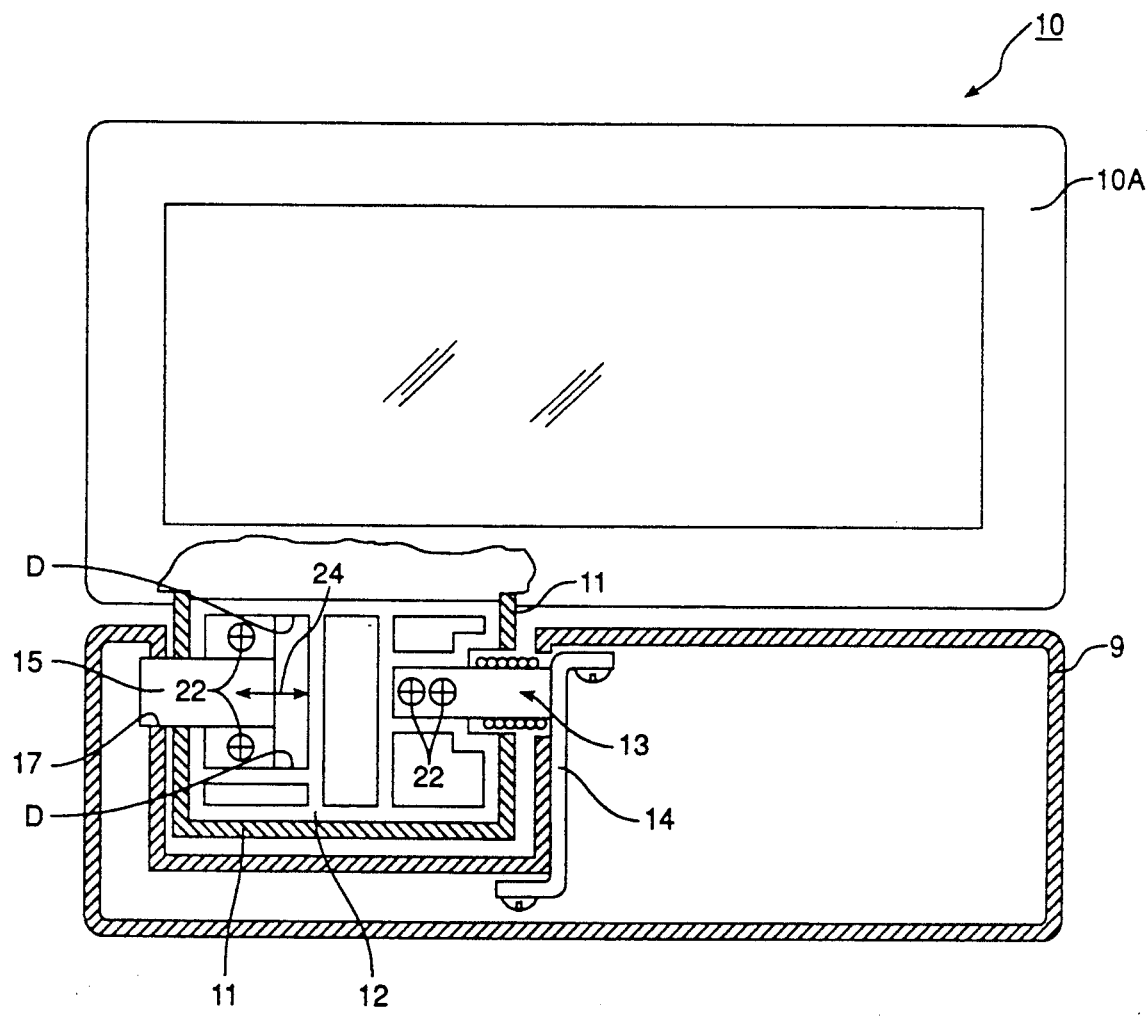

The pivotable display unit support structure 18 is mounted and housed within hinge arm 11 and will now be described relative to FIGS. 2A and 2B with reference to FIG. 3. As shown in FIG. 3, frame member 12 has first and second positioning regions A and B with flat guide surfaces C and vertical side walls D. Regions A and B are employed for proper alignment of hinge means 13 and 15 prior to their final securance to frame member 12 for pivotally supporting display unit 10A to housing 9. This hinge means comprises frictional first shaft member 13 and second shaft member 15, which are brought into surface engagement with flat guide surfaces C respectively within and between the confines established by side walls D. More specifically, as shown in FIG. 2A, frictional shaft member 13 and shaft member 15 are held within recess E formed in the front portion of housing 9 of apparatus 10. Preferably, frame member 12 is formed as a single, integral part, such as, an aluminum die casting. alternatively, member 12 may also be formed as two separate portions, one containing region A and the other containing region B.

As best shown in FIG. 3, left end portion 13C of frictional shaft member 13 is positioned at first positioning region A between side walls D of frame member 12 and is mounted on the right end portion of frame member 12 by fastening means 22. The right end portion 13B of frictional shaft member 13 is mounted through and held by a metal E ring (not shown) on support plate 14 and is secured to housing 9 by fastening means 23, as shown in FIG. 2A. One end of torsion coil spring 13A is fixed by frictional shaft member 13 at 25, and other end is fixed by support plate 14. The inner surface of torsion coil 13A is in contact with shaft portion 13D and is wound on the central portion of frictional shaft member 13. For this reason, when display unit 10A is rotatably pivoted to an open position, such as shown in FIG. 4, engagement between the inner surface of torsion coil 13A and corresponding shaft portion 13B generates a frictional force therebetween. An adjusted angle for viewing of display unit 10A relative to housing 9 is maintained by this frictional force once initial adjustment is made. Thus, an user may selectively adjust the tilt angle of unit 10A to accommodate optimum viewing of the display screen and the generated frictional force will hold secure unit 10A at the finally adjusted angle of view.

As shown in FIG. 3, shaft member 15 is positioned at second positioning region B of frame member 12 and is mounted at the left end portion of frame member 12 by fastening means 22. Shaft member 15 may be laterally translated between guide walls D of second positioning region B as illustrated by arrow 24 in FIG. 2B for purposes of final adjustment toward insertion of member 15 into aperture 17 and alignment of corresponding fastening holes.

When display unit 10A is secured to housing 9, display unit support arm 11 is first positioned and aligned relative to aperture 17 in recess E of housing 9 and frame member 12 is secured to arm 11 of display unit 10A by means of fasteners (not shown) inserted through openings 26 of frame member 12. Then, shaft member 15 is inserted between guide walls D and is translated laterally and the forward end of shaft member 15 is inserted into housing aperture 17 after which display unit 10A and housing 9 are easily and precisely aligned and connected to each other with the securing of shaft member 15 with fastening means 22 to frame member 12. Further, cable 16 for electrically connecting electronic circuitry positioned within housing 9 is connected to display unit 10 by passage of cable 16 through shaft member 15 since shaft member 15 is constructed as a hollow structure.

As is apparent from the above description, since frictional shaft member 13 and shaft member 15 are integrally positioned relative to each other as well as relative to housing 9 with the employment of integral frame member 12, shaft positioning of these two components can be precisely determined and implemented together with an increase in the overall structural strength, durability and useful life of the support hinge 11.

While the invention has been described in conjunction with a specific embodiment, it is evident to those skilled in the art that many further alternatives, modifications and variations will be apparent in light of the forgoing description. The present invention is not limited specifically to the above described embodiment. For example, the shape, the material, and the size of frame member 12, and the position of frame member 12 with respect to housing 9 can be arbitrarily selected, and these physical and material conditions are selected in accordance with desired application conditions relative to securing support hinge arm 11 to housing 9. Thus, the invention described herein is intended to embrace at such alternatives, modifications, applications and variations as fall within the spirit and scope of the appended claims.

What is claimed is:

1. A pivotable display unit support structure for electronic apparatus for pivotally coupling a pivotable display unit to an electronic apparatus housing comprising:
a first member extending from said display unit, a second member forming a recess in said electronic apparatus housing receiving said first member therein, said second member having aligned bearing supports formed in oppositely opposed walls of said recess, a first and second shaft members rotatably supporting said display unit directly on said housing, a ridged frame member inserted in and secured to said first member providing additional structural support thereto, said frame member having a first alignment means formed in said frame member positioning and securing said first shaft member in fixed aligned relation relative to said frame member and a second alignment means formed in said frame member positioning and securing said second shaft member in fixed aligned relation relative to said frame member whereby said secured first and second shaft members are accurately aligned relative to each other for self-aligned insertion into corresponding aligned bearing supports in said recess.

2. The pivotable display unit support structure according to claim 1 further comprising a torsion spring mounted on said first shaft member holding said display unit in a selected open angular position relative to said housing, an inner surface of which is in contact with said first shaft member, one end of said torsion spring secured relative to said electronic apparatus housing and the other end of said spring secured relative to said first shaft member.

3. The pivotable display unit support structure according to claim 1, wherein said second shaft member has a hollow portion.

4. The pivotable display unit support structure according to claim 3 wherein a cable for electrically coupling said electronic apparatus housing to said pivotable display unit is inserted through said hollow portion of said second shaft member.

5. The pivotable display unit support structure according to claim 1 wherein said first and second shaft members are held within an opening formed in said recess of said electronic apparatus housing.

6. The pivotable display unit support structure according to claim 1 wherein at least one floppy disk drive is located adjacent to said frame member relative to a front portion of said electronic apparatus housing.

7. The pivotable display unit support structure according to claim 1 wherein said first and second alignment means are integrally formed in said frame member.

8. The pivotable display unit support structure according to claim 7 wherein said frame member is a metal die casting.

9. The pivotable display unit support structure according to claim 1 wherein at least one of said frame member first and second alignment means includes a guide surface, at least one of said shaft members brought into surface engagement with said at least one alignment means, and side walls formed at adjacent edges of said guide surface aligning said at least one shaft member therebetween.

10. The pivotable display unit support structure according to claim 1 wherein said frame member second alignment means includes guide surfaces in surface engagement with said second shaft member and side walls formed at adjacent edges of said guide surfaces, said second shaft member slidably translatable between said side walls so that said second shaft member may be initially inserted into a corresponding aperture formed in an end portion of said apparatus housing prior to securing said second shaft member relative to said frame member second alignment means.

11. An electronic apparatus comprising:

a housing including a keyboard in a front portion and at least one user accessed unit positioned in a back portion, said user accessed portion being above the level of said keyboard for easy reach and access by the user over said keyboard a hinge means, a display unit pivotally connected to said housing via said hinge means such that said display unit can be pivoted over said keyboard in a closed position and can be pivoted to an upright position for viewing by a user, an extended member formed on an end portion of the bottom edge of said display unit, a corresponding recessed member formed on a portion of said housing laterally adjacent to said access unit and above said keyboard and vertically aligned relative to said extended member, said recessed member being formed adjacent to a side of said housing, and a ridged frame member coupling said extended and recessed members together in accurate aligned pivotal relationship, providing additional structural support to said members and forming said hinge means between said access unit and one side of said housing and said display unit so that the pivotal movement of said display unit does not interfere with the positional arrangement of said access unit and said hinge means being reinforced by said frame member providing sufficient strength to support said display unit in cantilevered relation over and across said housing toward a side of said housing opposite to said first mentioned housing side and maintaining alignment of said display unit relative to its pivotal relationship to said housing.

12. The electronic apparatus of claim 11 comprising alignment means integrally formed in said frame member, pivotal support means rotatably coupling said display unit to said housing via said frame member, said alignment means providing accurate positioning and alignment of said pivotal support means prior to securing together said display unit to said housing via said frame member and said pivotal support means.

13. The electronic apparatus of claim 12 wherein said pivotal support means comprises a first shaft member coupled to one end portion of said recessed member and a torsion spring mounted on said first shaft member with its inner surface in contact with said first shaft member for holding said display unit in a selected open angular position relative to said apparatus housing, one end of said torsion spring secured relative to said housing and the other end of said torsion spring secured relative to said first shaft member, a second shaft member coupled to another end portion of said recessed member, said second shaft member having a hollow portion for receiving a cable therethrough via said frame member for electrically coupling said housing to said pivotable display unit.

14. The electronic apparatus of claim 13 wherein alignment means on said frame member comprises a guide surface, at least one of said shaft members brought into surface engagement with said alignment means for positioning and thereafter securing said shaft member relative to said frame member, and side walls formed at adjacent edges of said guide surface aligning said at least one shaft member therebetween.

15. The electronic apparatus of claim 13 wherein said frame member alignment means comprises guide surfaces in surface engagement with said second shaft member and side walls formed at adjacent edges of said guide surfaces, said second shaft member slidably translatable between said side walls so that said second shaft member may be initially inserted into a corresponding aperture formed in an end portion of said recess member prior to securing said second shaft member relative to said frame member.

16. A pivotable display unit support structure comprising:
  a housing, a hinge means
  a display unit pivotally connected to said housing via said hinge means such that said display unit can be pivoted over the forward portion of said housing forming a closed position or can be pivoted upwardly away from said forward portion to an upright position for viewing by a user,
  a first member extending from said display unit,
  a second member forming a recess in said electronic apparatus housing to receive said first member therein, said second member having aligned bearing supports formed in oppositely opposed walls of said recess,
  a ridged frame member rotatably coupling said display unit to said housing and providing structural rigidity and support to said hinge means and maintaining alignment of said display unit relative to its pivotal relationship to said housing,
  said hinge means including first and second support members rotatably supporting said display unit directly on said housing, and
  alignment means integrally formed in said frame member, said alignment means providing accurate positioning and alignment of said first and second support members relative to said bearing supports formed in said second recess member prior to securing together said display unit to said housing via said frame member and said first and second support members.

17. The electronic apparatus of claim 16 wherein said alignment means on said frame member comprises a guide surface, said first and second support members brought into surface engagement with said alignment means, and side walls formed at adjacent edges of said guide surface aligning said first and second support members therebetween.

18. The electronic apparatus of claim 16 wherein said alignment means comprises guide surfaces for surface engagement with said first and second support members and side walls formed at adjacent edges of said guide surfaces, said support members slidably translated between said side walls for their respective initial insertion into a corresponding apertures formed in end portions of said second recess member prior to securing said support members relative to said frame member alignment means.

* * * * *